(12) United States Patent
Ronen et al.

(10) Patent No.: US 6,647,482 B1
(45) Date of Patent: Nov. 11, 2003

(54) METHOD FOR OPTIMIZED REPRESENTATION OF PAGE TABLE ENTRIES

(75) Inventors: Ronny Ronen, Haifa (IL); Andrew F. Glew, Portland, OR (US); Maury J. Bach, Haifa (IL); Robert C. Valentine, Kiryat Tivon (IL); Richard A. Uhlig, Hillsboro, OR (US); Opher D. Kahn, Zichron Yacov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/545,056

(22) Filed: Apr. 7, 2000

(51) Int. Cl.⁷ .............................................. G06F 12/04
(52) U.S. Cl. ........................ 711/212; 711/201; 711/208; 711/219
(58) Field of Search ................................ 711/200, 212, 711/201, 206, 214, 217, 219, 220, 208

(56) References Cited

U.S. PATENT DOCUMENTS

| | | | | |
|---|---|---|---|---|
| 4,897,652 A | * | 1/1990 | Leon ............................. 341/51 |
| 5,465,337 A | * | 11/1995 | Kong ........................... 711/206 |
| 5,648,774 A | * | 7/1997 | Hsieh ............................ 341/67 |
| 5,761,741 A | * | 6/1998 | Robbins et al. ............. 711/201 |
| 5,907,867 A | * | 5/1999 | Shinbo et al. ............... 711/207 |
| 6,088,780 A | * | 7/2000 | Yamada et al. ............. 711/204 |

* cited by examiner

Primary Examiner—Pierre-Michel Bataille
(74) Attorney, Agent, or Firm—Blakely, Sokoloff, Taylor & Zafman LLP

(57) ABSTRACT

Method for producing a predetermined length page memory pointer record, according to a selected page size and a selected page address, the method including the procedures of: determining a dynamic location of a separator bit within the page memory pointer record, according to the selected page size and an initial page size, the initial page size being respective of the smallest page size in a given memory system, writing a predetermined value to the dynamic location, writing a sequence of values opposite to the predetermined value to selected page size bits of the page memory pointer record, when the selected page size is different than the initial page size, and writing the selected page address to selected page address bits of the page memory pointer record.

6 Claims, 6 Drawing Sheets

METHOD FOR OPTIMIZED REPRESENTATION OF PAGE TABLE ENTRIES

FIELD OF THE INVENTION

The present invention relates to methods and system for memory management in general, and to methods and systems for managing memory in pages, in particular.

BACKGROUND OF THE INVENTION

Intermediate storage elements are known in the art. A conventional computer system includes random access memory (RAM), which is used for uploading software objects, executing them and for storing data objects, used by the software objects.

The RAM size is often limited. When the memory requirements exceed the RAM size, then the system can allocate a storage area on another storage element, such as a hard drive, and define this storage area as virtual memory, serving as an extension of the RAM. Data portions, which are not often used, can be stored in the virtual memory until the system retrieves them for further processing.

The RAM of a conventional computer system can be in the range of 32 MB–2 GB and the numbers increase constantly. It will be appreciated by those skilled in the art that the small data segments (a single bit, a byte and a word) can not be used for allocating memory in an efficient way. Conventional methods for managing memory allocate large portions of these segments. These portions are in the range of several kilobytes to several megabytes.

One conventional method, known in the art, for managing memory resources is called paged memory. This method determines a plurality of memory portions, called memory pages. Each memory page is of a predetermined set of sizes (for example, 4 KB, 16 KB). The memory is managed by a memory management module within the computer system, which can be implemented either in hardware or in software, either as a part of the operating system or of the computer chip-set.

The memory management module receives a memory allocation request for a block of memory, from a software module. The memory management module allocates memory pages having a total size, which can contain the requested amount of memory.

For each allocated memory portion, the memory allocator provides both a physical location and a logical representation. The physical location includes a selected portion of the overall memory size available in the computer system. The logical representation is the address seen by the software module. This address is used to index an entry in a special table, called the page table, which points to the physical location. It is noted that additional management mechanisms can be added to this structure, but those mechanisms will not be discussed herein below, so as to maintain the simplicity of the description.

The entries in the page table are called page table entries. Page table entries should indicate the physical address of the page, the page size and additional attributes about the page. The page size is always a power of 2, and the page address is always aligned on a page boundary (that is, can be divided by the page size). A page record is adapted to the environment in which it is processed. In a sixty-four-bit processor, this record includes, sixty-four bits and so does the entire address space. In an example, where the size of a memory page block is 4 KB ($2^{12}$), fifty-two bits are required to point to any such block. In a system, which utilizes memory pages in several sizes, the page record has to include additional information relating to the size of the page associated with that record. The remaining bits in the record are used for various attributes such as, "read only", "modified", "write once", "for system use only" and the like.

Reference is now made to FIGS. 1A and 1B. FIG. 1A is a representation of a page table entry string, generally referenced 10, representing a predetermined page, which is known in the art. FIG. 1B is a representation of the memory page record string of FIG. 1A, representing a different memory page.

With reference to FIG. 1A, string 10 is divided into sub strings 12, 14 and 16. Sub-string 12 is a representation of the page address, sub-string 14 is a representation of the page size and sub-string 16 is a representation of the memory page attributes.

In the present example, the overall length of string 10 is sixty four bits, the length of page address sub-string 12 is fifty two bits, and the page size representation sub-string 14 includes three bits, which provide up to eight options of page sizes ($2^3$). In the present example, the system utilizes the following page sizes: 4 KB, 8 KB, 16 KB, 32 KB, 64 KB, 128 KB, 256 KB and 512 KB. As a result of the above, the length which is set for the attribute sub-string is nine bits. It is noted that the system can utilize page sizes, which are not sequential, such as 4 KB, 32 KB, 64 KB, 256 KB, and the like.

Page size representation sub-string 14 stores a sequence "000" which, in the present example, indicates the first and smallest page size of 4 KB. With reference to FIG. 1B, the page size representation sub-string 14 stores a sequence "010" which, in the present example, indicates the third page size of 16 KB.

According to the above arrangement, the length of the attribute representation sub-string is the result of subtraction of the address sub-string and the size sub-string from the overall length of the page record string.

The above arrangement is also limited to eight different sizes of pages. If the system utilizes a greater number of pages, then additional bits have to be allocated from the attribute sub-string to the page size sub-string, thus reducing even more the length of the attribute sub-string.

SUMMARY OF THE PRESENT INVENTION

A method for optimized representation of page table entries and corresponding page-based memory access scheme are disclosed. The method includes the use of a predetermined length memory page pointer record that implements a separator bit between variable-length page address and page size sub-strings. Based on the location of the separator bit, the page sized used by a memory system may be determined. Similarly, a page size to be used by the memory system may be defined by generating memory page pointer records that have a separator bit at a location corresponding to the desired page size. The memory page pointer record may also include attribute bits that define characteristics of the memory stored at a given page and offset specified by the record. The method and scheme also support the use of multiple page sizes within the same memory system.

BRIEF DESCRIPTION OF THE DRAWINGS

The disclosed technique will be understood and appreciated more fully from the following detailed description taken in conjunction with the drawings in which.

DETAILED DESCRIPTION

The present disclosure provides a novel page address and size representation, which dynamically addresses different size pages. According to one embodiment, a fixed length field contains both the address and size field of pages. The assigned length of this field is one bit longer than the length of the largest page address in the system. Applicant found that the address space in a selected page size is counter-proportional to the page size. For example, if the address space of a $2^n$ page size is $2^m$, then the address space of a $2^{n+k}$ is $2^{m-k}$. Hence, the total length of the page size and page address space remains constant, where the n and m are given.

$$(n+k)+(m-k)=n+m=\text{const}$$

Accordingly, the disclosed technique assigns a dynamic page address space according to a given page size. The page size is set in a string of sequential bits and is determined according to the smallest page size. For example, a page size sub-string having a length of zero (no bits) denotes the smallest page size in the system and a page size sub-string having a length of six bits denotes the seventh page size in the system. In an example, where the smallest page size is 8 KB ($2^{13}$), then the seventh page size in the system is 512 KB ($2^{19}$). One embodiment includes a separator sub-string, which in the following examples includes a single bit, of an opposite value than the ones denoting the page size.

Figure 1A:
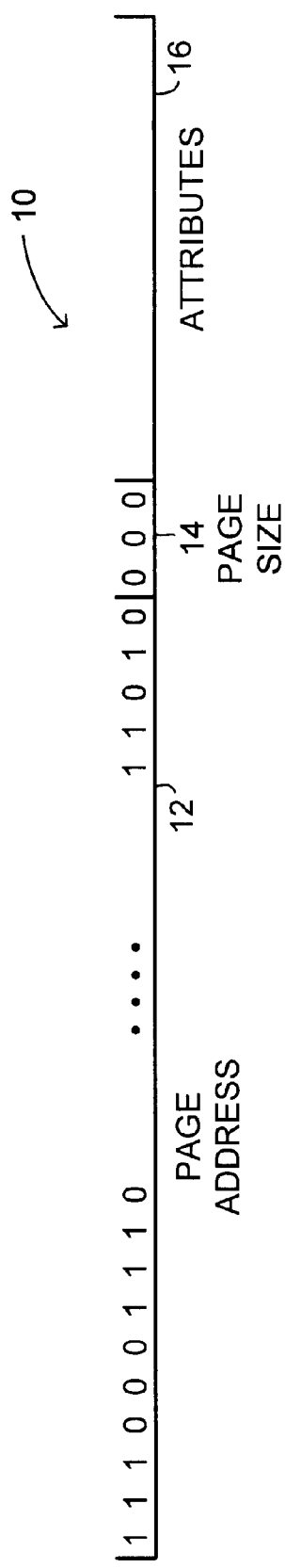
FIG. 1A is a representation of a memory page record string, representing a predetermined page size, which is known in the art.
Figure 1B:
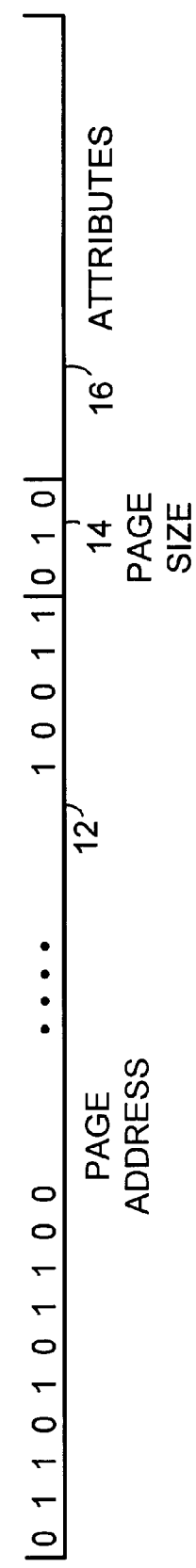
FIG. 1B is a representation of the memory page record string of FIG. 1A, representing a different memory page size.
Figure 2A:
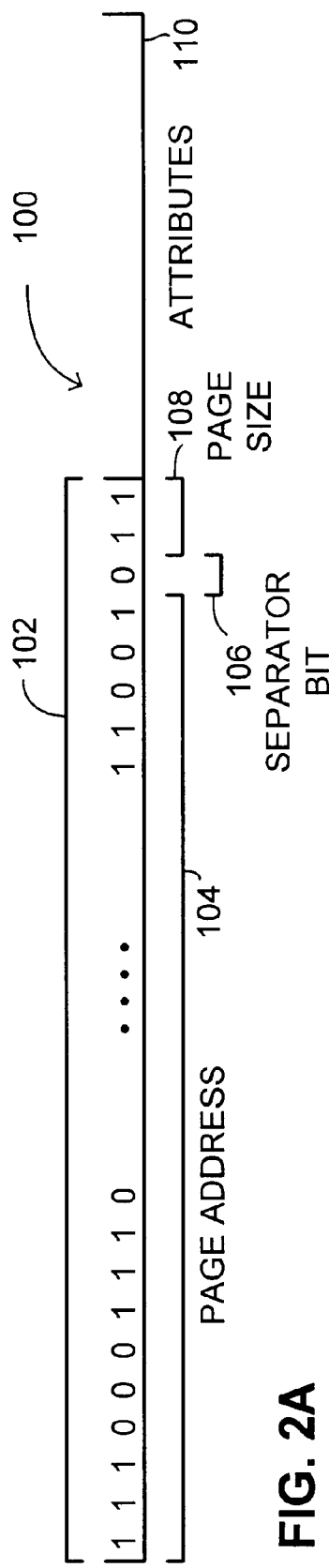
FIG. 2A is an illustration of one embodiment of a memory page record string, representing a first page size.
Figure 2B:
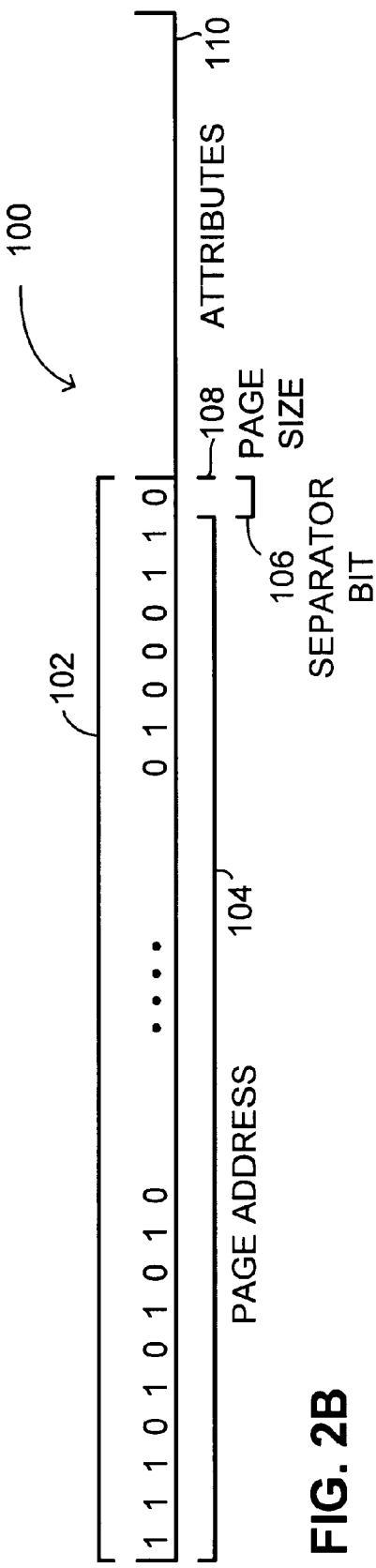
FIG. 2B is an illustration of the memory page record string of FIG. 2A, representing a second page size.
Figure 2C:
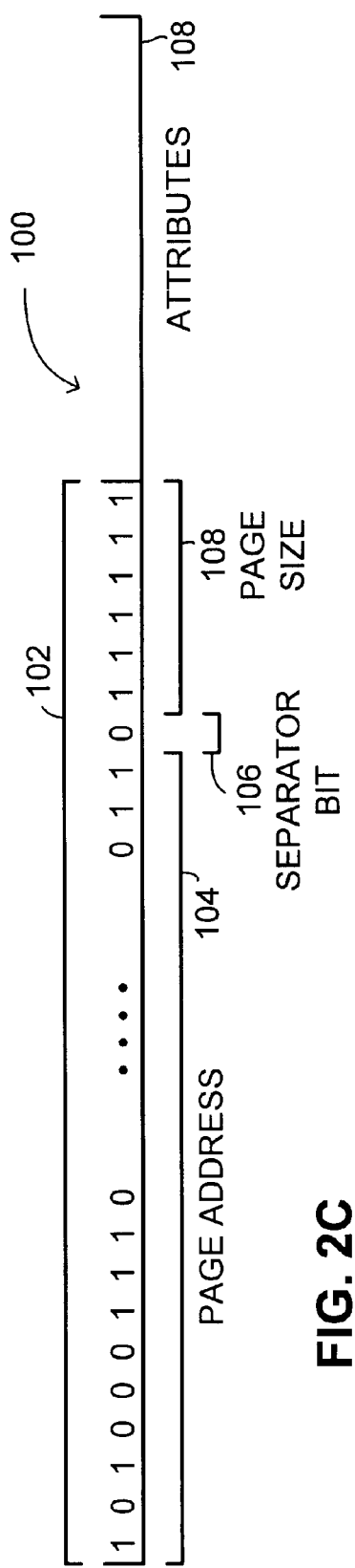
FIG. 2C is an illustration of the memory page record string of FIGS. 2A and 2B, representing a third page size.
Figure 2D:
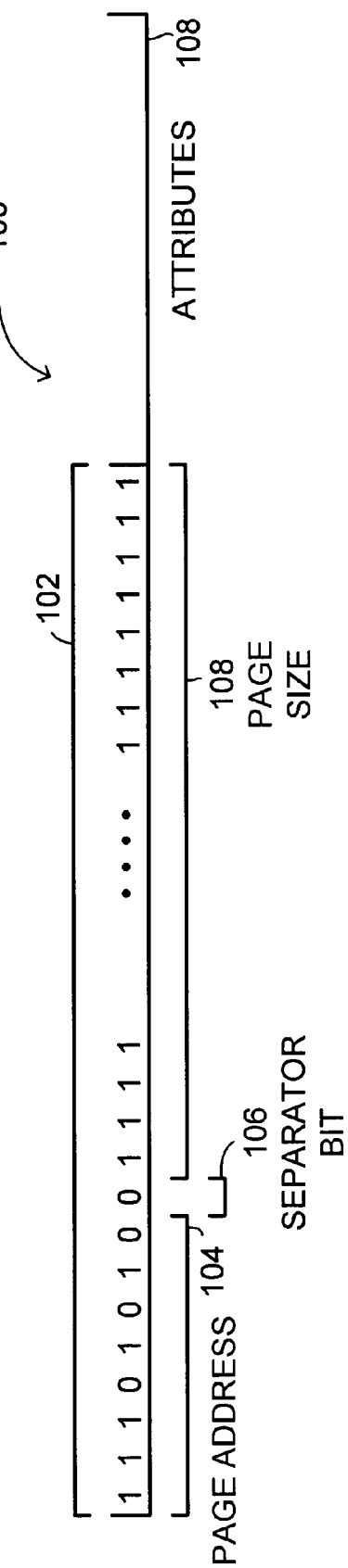
FIG. 2D is an illustration of the memory page record string of FIGS. 2A, 2B and 2C, representing a general page size.

Reference is now made to FIGS. 2A, 2B, 2C and 2D. FIG. 2A is an illustration of a memory page record string, generally referenced 100, representing a first page size, in accordance with one embodiment. FIG. 2B is an illustration of the memory page record string 100 of FIG. 2A, representing a second page size. FIG. 2C is an illustration of the memory page record string 100 of FIGS. 2A and 2B, representing a third page size. FIG. 2D is an illustration of the memory page record string 100 of FIGS. 2A, 2B and 2C, representing a general page size.

With reference to FIG. 2A, string 100 includes a combined page size and address sub-string 102 and an attribute sub-string 110. Combined sub-string 102 is dynamically divided by a separator bit 106 into a page address sub-string 104 and a page size sub-string 108. The length of the combined sub-string 102 is constant.

In the example set forth in FIG. 2A, the separator bit, having a value of "0", is located at the third location from the right side of sub-string 102, thus representing a third level page size and address. Where the smallest page size is $2^n$, the page size provided by this example is $2^{n+2}$.

This is denoted by a continuous set of bits, to the right side of the separator bit, until the end of sub-string 102. Each bit in this set of bits, has a value, which is opposite to that of the separator bit 106, as presented by the sequence "11" in the page size sub-string. Hence, combined sub-string 102 represents a third level page size and address. Accordingly, the page address sub-string 104 includes $2^{n-2}$ bits, suitable for the address space respective of this page size. In case where the minimal page size is 4 KB (fifty-two bit address length), then the length of page address sub-string 104 is fifty bits and the overall length of sub-string 102 is fifty three bits.

With reference to FIG. 2B, the separator bit 106 is located at the first place from the right of sub-string 102, thus representing a first level page size, leaving the entire length of sub-string 102 minus one bit to be the length of the page address sub-string 104. According to this example, the length of the page size sub-string 108 is zero (no bits). In case where the minimal page size is 4 KB (fifty two bit address length), then the length of page address sub-string 104 is fifty two bits and the overall length of sub-string 102 remains fifty three bits.

With reference to FIG. 2C, the separator bit 106 is located at the seventh place from the right of sub-string 102, thus representing a seventh level page size. In this case, the page size sub-string includes a sequence of "111111" bits. Accordingly, the page address sub-string 104 includes $2^{n-6}$ bits, suitable for the address space respective of this page size. In case where the minimal page size is 4 KB (fifty two bit address length), then the length of page address sub-string 104 is forty six bits and the overall length of sub-string 102 still remains fifty three bits.

With reference to FIG. 2D, the separator bit 106 is located at the $k^{th}$ place from the right of sub-string 102, thus representing a $k^{th}$ level page size. Accordingly, the page address sub-string 104 includes $2^{n-k}$ bits, suitable for the address space respective of this page size ($2^k$). In case where the minimal page size is 4 KB (fifty-two bit address length), then the length of page address sub-string 104 is 52–k+1 bits. Again, the overall length of sub-string 102 remains fifty-three bits.

According to the above example, in a case where the minimal page size is 4 KB, the overall length which is required for the page size and address is fifty three bits, which leaves eleven bits for the attribute sub-string 110.

The disclosed techniques provides a complete variety of page sizes from a predetermined minimal length, up to a page which virtually includes the entire memory, where k=n. The disclosed technique provides this without increasing the sub-string length.

Figure 3:
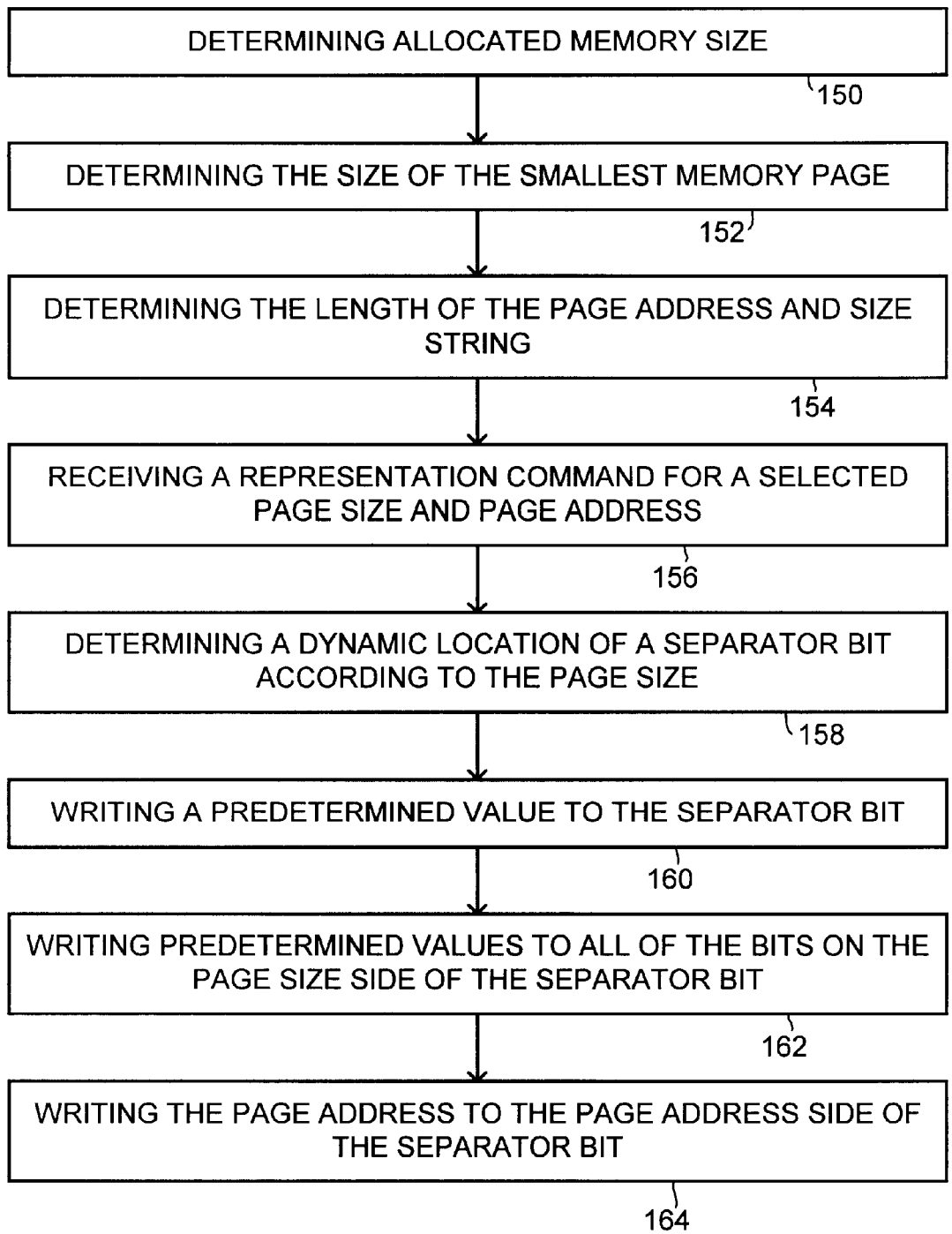
FIG. 3 is a schematic illustration of a method for operating a page memory management module, operative in accordance with a further embodiment.

Reference is now made to FIG. 3, which is a schematic illustration of a further embodiment of a method for operating a page memory management module. In procedures 150 and 152, the characteristics of the entire memory system are defined, according to the available memory size and other parameters, such as statistical data and the like. These procedures are preliminary to this method and can be performed once every restart, or may be determined as a part of system design. The size of the smallest page can for example, be defined according to the length of the attribute sub-string required, where j denotes the attribute sub-string length and $2^{j-1}$ denotes the size of the smallest memory page. It is noted that from an architecture view point, all page sizes can coexist at the same time for different uses. However, the minimal page size is predetermined for a given architecture.

In procedure 154, the length of the page address and size sub-string is determined. With respect to FIG. 2A, the length of sub-string 102 is determined. For example, in a sixty-four bit processor where j denotes the attribute sub-string length, the length of sub-string 102 is 64−j and the address space for the smallest page size is 64−j−1.

In procedure 156, a representation command for a selected page size and page address, is received. This command is received from the memory management module, in response to a system request.

In procedure 158, the location of the dynamic separator bit is determined according to the level of page size. In general, this place is set directly according to the level of the page size, with respect to the smallest page size level (e.g., the number of the level), from a predetermined page size side of sub-string 102. For example, if the predetermined page size side is left and the page size level in the request is the fifth level, then the location of the separator bit is the fifth bit from the left, within sub-string 102. With reference to FIG. 2A, the predetermined page size side is set to be the right side and thus the location of the separator bit should be the fifth bit from the right side of sub-string 102. It is noted that the determining of the page size side, automatically determines the page address side to the opposite thereof. In the example set fourth in FIG. 2A, where the page size side is determined the right side, then the page address side is thus determined left.

In procedure 160, a predetermined value is written to the recently determined separator bit location and a plurality of opposite values are written to all of the bits which are located on the predetermined page size side of the separator bit (procedure 162). With reference to FIG. 2A, where the separator bit 106 is set to be "0", then page size sub-string 108 is set to be a sequence of "1" value bits. It is noted that this procedure is virtually skipped at the first page size level, where the length of the page size sub-string is null (no bits) as in FIG. 2B. Alternatively, the separator bit can have a value of "1" and the page size sub-string bits can accordingly have values of "0".

In procedure 164, the page address is written to the page address sub-string, which is located at the opposite side of the separator bit. With reference to FIG. 2A, the page address is written to the page address sub-string 104.

Figure 4A:
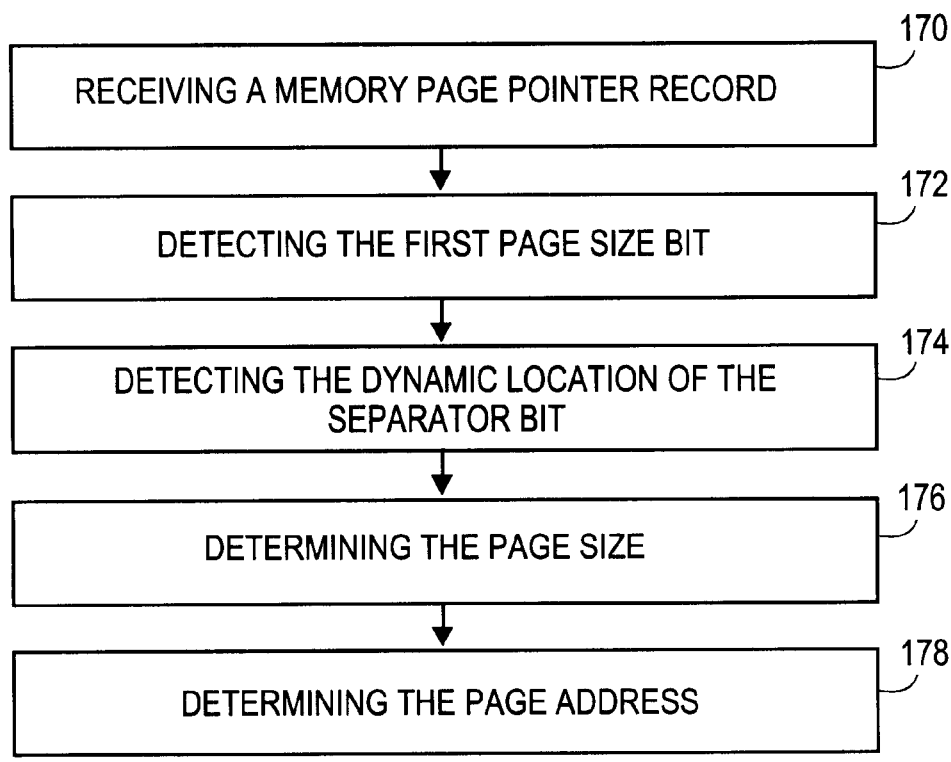
FIG. 4A is a schematic illustration of a retrieval method for operating a page memory management module, operative in accordance with another embodiment.

Reference is now made to FIG. 4A, which is a schematic illustration of a retrieval method for operating a page memory management module, in accordance with another embodiment.

In procedure 170, a memory page record is received. This record is retrieved from a page memory table. In procedure 172, the page size sub-string end is accessed and a search procedure for the separator bit is initiated (procedure 174). With reference to FIG. 2A, the memory management module accesses the bit which is located at the right end of sub-string 102 and starts scanning to the left.

Figure 4B:
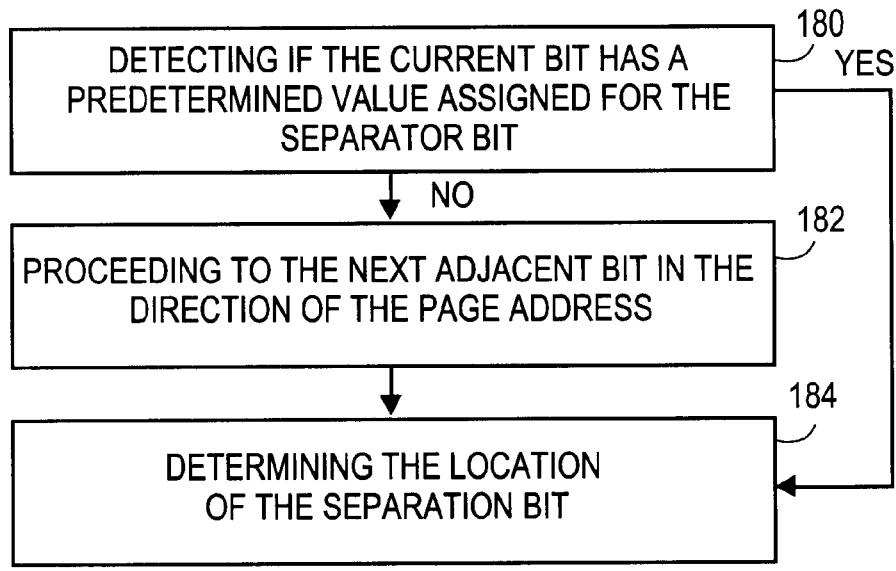
FIG. 4B is a detailed illustration of the procedure of detecting of the retrieval method of FIG. 4A, operative in accordance with a further embodiment.

Reference is further made to FIG. 4B, which is a detailed illustration of the procedure of detecting of the retrieval method of FIG. 4A, operative in accordance with a further embodiment. In procedure 180, the current bit is compared against a predetermined value, assigned for the separator bit. With reference to FIG. 2A, the memory management module detects if the currently accessed bit (e.g., the first bit on the right side of sub-string 102) has a value of "0". If so, then the memory management module proceeds to procedure 184 and determines that location as the location of the separator bit. Otherwise, the memory management module proceeds to procedure 182.

In procedure 182, the memory management module proceeds to the adjacent bit in sub-string 102, in the direction of the page address (e.g., to the left) and repeats from procedure 180.

Referring back to FIG. 4A, in procedure 176, the page size is determined according to the location of the separator bit. Alternatively, the page size can be determined according to the number of bits in sub-string 108, all having a value opposite to the predetermined value of the separation bit, as described above. According to the determined page size, the page address (length and position of the page address sub-string) can be determined (procedure 178) and the address can be retrieved therefrom.

It is noted that further procedures of retrieving the actual page from the memory can be added, and are not described herein.

Figure 5:
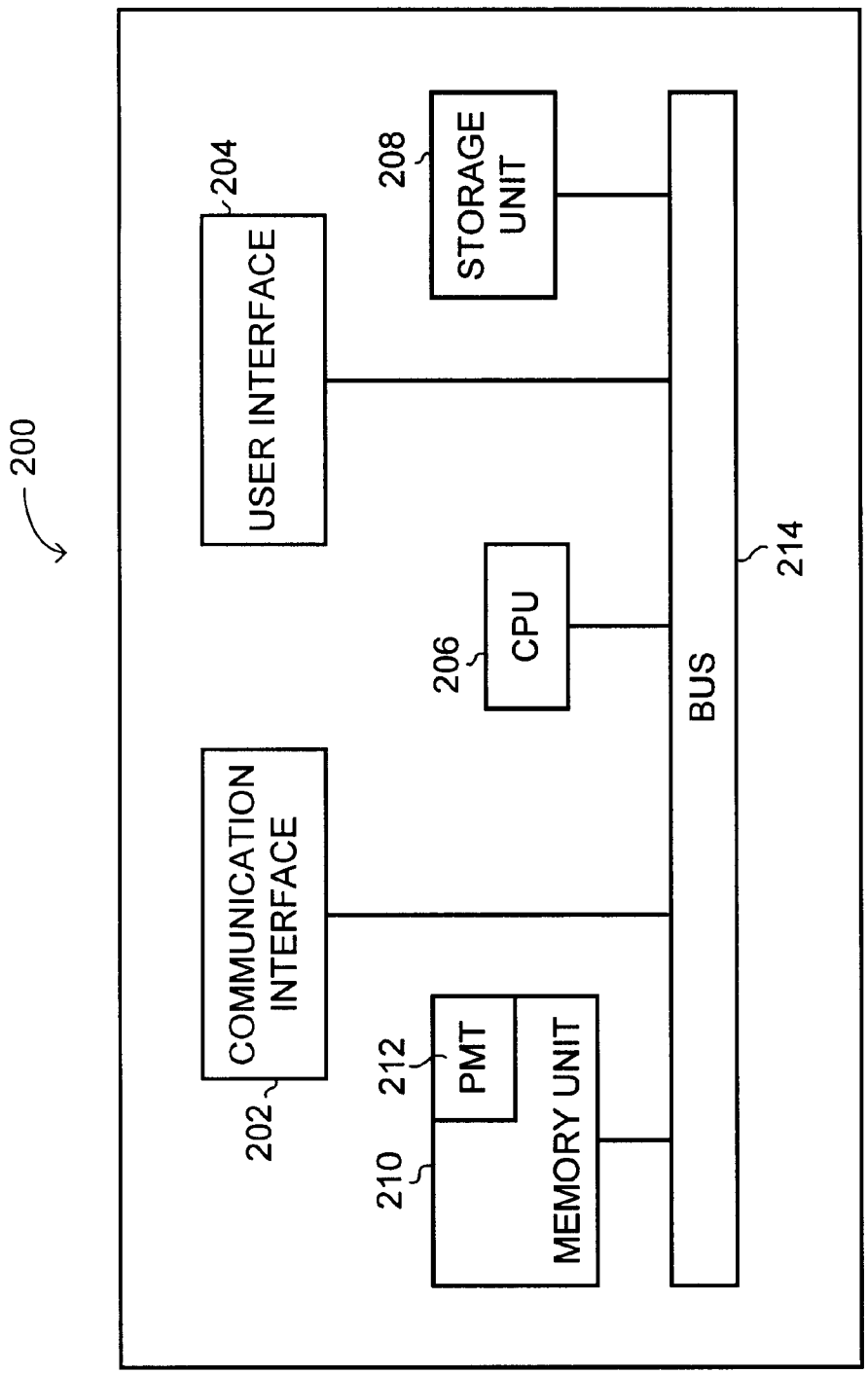
FIG. 5, is a schematic illustration of a computer system, operative in accordance with another embodiment.

Reference is now made to FIG. 5, which is a schematic illustration of a computer system, generally referenced 200, operative in accordance with another embodiment. Computer system 200 includes a communication interface 202, a user interface 204, a CPU 206, a storage unit 208, and a memory unit 210. Memory unit 210 includes a page memory table 212 therein.

Communication interface 202, user interface 204, CPU 206, storage unit 208, and memory unit 210 are interconnected via bus 214.

Communication interface 202 provides communication between computer system 200 and a remote computer, or a plurality of computers connected in a network (not shown). Communication interface 202 may consist of a wired or a wireless module known in the art, such as a modem and the like. User interface 204 provides communication between computer system 200 and a user. User interface 204 may consist of a visual, tactile, or audio unit known in the art, such as monitor, keyboard, pointing device, microphone, speaker and the like.

Storage unit 208 may consist of a module for storage and retrieval of data, as known in the art, such as a hard drive, an optical drive and the like. Memory unit 210 may consist of a board mounted chip of the type known in the art, such as RAM, DRAM, SDRAM, and the like. Page memory table 212 contains memory page records as described herein above, in conjunction with FIGS. 4A–4D.

CPU 206 defines a plurality of memory pages, which are either located in memory unit 210 or in storage unit 208. CPU 206 utilizes page memory table 212 in the process of managing these memory pages.

It will be appreciated by persons skilled in the art that the disclosed technique is not limited to what has been particularly shown and described herein above. Rather the scope of the disclosed technique is defined only by the claims, which follow.

What is claimed is:

1. In a multi page size memory system, including an initial page size, said initial page size being respective of the smallest page size in the memory system, a method for retrieving page size and page address from a memory page pointer record, the memory page pointer record having a dynamic length page size sub-string and a dynamic length page address sub-string, separated by a separator bit, the method comprising the procedures of:

detecting the location of said separator bit;

determining the page size from the location of said separator bit;

determining the location and length of said dynamic length page address sub-string, from said location of said separator bit; and retrieving the page address from said dynamic length page address sub-string.

2. The method according to claim 1, wherein said step of detecting the location of said separator bit is performed according to the content of said page size sub-string.

3. Method for producing a predetermined length page memory pointer record, according to a selected page size and a selected page address, the method comprising the procedures of:

determining a dynamic location of a separator bit within said page memory pointer record, according to said selected page size and an initial page size, said initial page size being respective of the smallest page size in a given memory system;

writing a predetermined value to said dynamic location;

writing a sequence of values opposite to said predetermined value to selected page size bits of said page memory pointer record, when said selected page size is different than said initial page size; and writing said selected page address to selected page address bits of said page memory pointer record.

4. The method according to claim 3, further comprising the procedures of:

determining the location of said selected page size bits, at one side of said separator bit; and determining the location of said selected page address bits, at the other side of said separator bit.

5. The method according to claim 3, further comprising the procedure of determining the length of said sequence of values to be one less than the level of said selected page size.

6. The method according to claim 3, further comprising the procedure of determining attribute bits in said predetermined length page memory pointer record, said attribute bits being other than said page address bits, said page size bits and said separator bit.

* * * * *